(12) United States Patent
Sulaiman et al.

(10) Patent No.: US 11,885,308 B2
(45) Date of Patent: Jan. 30, 2024

(54) LIGHTNING MAGNETIC FLUX DENSITY REDUCTION IN WIND TURBINES

(71) Applicant: Siemens Gamesa Renewable Energy A/S, Brande (DK)

(72) Inventors: Sajeesh Sulaiman, Karnataka (IN); Aravind Devaraj, Kerala (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/695,179

(22) Filed: Mar. 15, 2022

(65) Prior Publication Data

US 2022/0307482 A1 Sep. 29, 2022

(30) Foreign Application Priority Data

Mar. 24, 2021 (EP) .................... 21164585

(51) Int. Cl.
| | |
|---|---|
| *F03D 80/30* | (2016.01) |
| *F03D 9/25* | (2016.01) |
| *H02K 11/01* | (2016.01) |
| *H02K 7/18* | (2006.01) |
| *F03D 80/80* | (2016.01) |

(52) U.S. Cl.
CPC .............. *F03D 80/30* (2016.05); *F03D 9/25* (2016.05); *F03D 80/80* (2016.05); *H02K 7/1838* (2013.01); *H02K 11/014* (2020.08); *F05B 2220/706* (2013.01)

(58) Field of Classification Search
CPC .......... F03D 80/30; F03D 9/25; H02K 7/1838
See application file for complete search history.

(56) References Cited

U.S. PATENT DOCUMENTS

| | | | |
|---|---|---|---|
| 7,154,192 B2* | 12/2006 | Jansen | F03D 9/25 |
| | | | 290/55 |
| 7,205,675 B2* | 4/2007 | McKinnell | H01L 23/38 |
| | | | 700/278 |
| 7,377,750 B1 | 5/2008 | Costin et al. | |

(Continued)

FOREIGN PATENT DOCUMENTS

| | | |
|---|---|---|
| EP | 0723328 A2 | 7/1996 |
| EP | 3712429 A1 | 9/2020 |

(Continued)

OTHER PUBLICATIONS

European Search Report dated Oct. 13, 2021 for application No. 21164585.8.

*Primary Examiner* — Topaz L. Elliott
*Assistant Examiner* — Wesley Le Fisher
(74) *Attorney, Agent, or Firm* — Schmeiser, Olsen & Watts LLP

(57) ABSTRACT

Provide is a nacelle for a wind turbine includes: an external surface exposed to a magnetic flux induced by lightning, an electrical generator rotating about a rotational axis, the electrical generator including a rotor, a stator, an airgap separating the rotor and the stator, and a plurality of electrical conductors wound in the rotor or the stator adjacently to the airgap, a lightning protection arrangement including at least one waveguide between the rotor and the stator and interposed between the external surface and the airgap for providing a shielding to the electrical conductors from the magnetic flux induced by lightning.

16 Claims, 3 Drawing Sheets

(56) References Cited

U.S. PATENT DOCUMENTS

| | | | | |
|---|---|---|---|---|
| 7,944,074 B2* | 5/2011 | Longtin | ............... | F03D 7/02 |
| | | | | 310/90 |
| 8,873,214 B2* | 10/2014 | Catchpole | ............... | F03D 80/30 |
| | | | | 361/220 |
| 10,066,607 B2* | 9/2018 | Søgaard | ............... | F03D 1/065 |
| 10,148,154 B2* | 12/2018 | Arlabán | ............... | F03D 9/25 |
| 10,910,920 B2* | 2/2021 | Torrey | ............... | H02K 55/04 |
| 11,592,006 B2* | 2/2023 | Groendahl | ............ | H02K 11/40 |
| 2006/0066110 A1* | 3/2006 | Jansen | ............... | F03D 15/20 |
| | | | | 290/44 |
| 2009/0121491 A1 | 5/2009 | Mikkelsen | | |
| 2012/0040578 A1* | 2/2012 | Anjema | ............ | B29C 70/885 |
| | | | | 442/181 |
| 2015/0083863 A1* | 3/2015 | Karthauser | ............ | F03D 80/40 |
| | | | | 219/209 |
| 2017/0074251 A1* | 3/2017 | Airoldi | ............... | F03D 9/25 |
| 2019/0383275 A1* | 12/2019 | Pubanz | ............... | F03D 80/00 |

FOREIGN PATENT DOCUMENTS

| | | | | |
|---|---|---|---|---|
| WO | WO-2016091882 A1 * | 6/2016 | ............ | B64D 15/12 |
| WO | WO-2018153520 A1 * | 8/2018 | ............ | F03D 80/30 |
| WO | WO 2018153520 A1 | 8/2018 | | |

* cited by examiner

LIGHTNING MAGNETIC FLUX DENSITY REDUCTION IN WIND TURBINES

CROSS-REFERENCE TO RELATED APPLICATIONS

This application claims priority to EP Application No. 21164585.8, having a filing date of Mar. 24, 2021, the entire contents of which are hereby incorporated by reference.

FIELD OF TECHNOLOGY

The following relates to a lightning protection arrangement for a wind turbine. The arrangement is aimed at avoiding critical magnetic flux density in electrical critical components of a wind turbine.

BACKGROUND

A magnetic field is a vector field that describes the magnetic influence of electric charges in relative motion and magnetized materials. A wind turbine is consequently subject to electric and magnetic fields, for example designed electromagnetic fields are present in a wind turbine due to the presence of complex electrical systems or natural electromagnetic fields determined by lightning strike.

Wind turbines have normally shape and dimensions which make them good receptors for lightning strikes. Magnetic fields created by lightning strikes may reach an intensity in the order of 90,000 A/m. Such a strong magnetic field may create electromagnetic disturbances and possibly damage electrical or electronic items of the wind turbine. Considering that a magnetic field is produced in direction perpendicular to electric field, burst of electromagnetic fields are created within the turbines as the lightning current flows through the down conductors of the lightning protection systems and other grounding paths. Although these electromagnetic magnetic are of short duration, they may give rise to induced voltages within various parts of the wind turbine, especially at the airgap between rotor and stator, creating high possibilities of flashovers. These occurrences may damage critical components which are installed adjacently to the airgap. Such components include the generator electrical windings, which are housed in slots of the stator or rotor, and the generator permanent magnets. The latter may be at least partially demagnetized, hence reducing the overall efficiency of the wind turbine.

The lightning protection system has to be therefore carefully designed, in particular considering the induced voltage on the generator coils due to this magnetic field. Over voltage protection devices may be further provided on the generator windings to protect them from the induced voltage impact of lighting. Such devices however increase costs.

The scope of embodiments of the present invention are therefore to provide a wind turbine having features, which permit reducing the electromagnetic fields induced by lightening at the airgap between stator and rotor.

SUMMARY

An aspect relates to a nacelle for a wind turbine is provided. The nacelle includes:
an external surface exposed to a magnetic flux induced by lightning,
an electrical generator rotating about a rotational axis, the electrical generator comprising a rotor, a stator, an airgap separating the rotor and the stator, and a plurality of electrical conductors wound in the rotor or the stator adjacently to the airgap,
wherein the nacelle further includes:
a lightning protection arrangement including at least one waveguide between the rotor and the stator and interposed between the external surface and the airgap for providing a shielding to the electrical conductors from the magnetic flux induced by lightning.

As "waveguide" it is intended an electromagnetic feed line. A waveguide consists of a rectangular or cylindrical metal passage, where the electromagnetic field propagates lengthwise or is prevented to propagate, depending on the dimensions of the waveguide. Waveguide designed according to embodiments of the present invention allows a limited passage of the magnetic field that is produced during an event of lightning strike.

When an external surface, such as the external surface of the nacelle, is subject to an electromagnetic field, any opening provided on such surface may cause the electromagnetic field to leak in the inner volume of the nacelle, the bigger the opening greater the possible leakage. According to embodiments of the present invention, a waveguide is provided between the surface opening and the airgap for reducing or eliminating the electromagnetic leakage. The waveguide may have the same width of the opening. This causes the lightning magnetic field inside the nacelle, particularly at the airgap between rotor and stator, to be conveniently reduced.

This design may provide the further key advantages that over voltage protection may be no longer required and that cables insulation and other voltage insulation features on windings may be reduced, According to embodiments of the present invention, the waveguide may be provided at an opening separating the rotor from the stator. Embodiments of the present invention may be applied to wind turbines having inner stator and external rotor or to wind turbines having inner rotor and external stator.

According to embodiments of the present invention, the lightning protection arrangement comprises a stationary plate, fixed to the stator and a rotary plate fixed to the rotor, the waveguide being provided between the stationary plate and the rotary plate, the stationary plate or the rotary plate being exposed to the magnetic flux induced by lightning. In specific embodiments of the present invention where the rotor is external to the stator, the rotary plate includes the external surface exposed to the magnetic flux induced by lightning. Such rotary plate may comprise the brake disc of the rotor.

According to embodiments of the present invention, the lightning protection arrangement comprises a structural element connected the stator and extending along the rotational axis, the stationary plate protruding at an axial end of the structural element. The structural element connected the stator may have a hollow cylindrical structure coaxial with the rotational axis from which the stationary plate may protrude radially, for example in the form of a radial external flange attached at the axial end of the structural element.

According to embodiments of the present invention, the waveguide may be inclined with respect to the rotational axis of angle comprised between 0 and 90 degrees. More particularly, the waveguide may be inclined with respect to the rotational axis of angle comprised between 45 and 90 degrees. The waveguide may have a width comprised between 1 and 15 mm. More particularly, the waveguide may have a width comprised between 8 and 12 mm.

The waveguide may have a length comprised between 200 and 700 mm, more particularly between 400 and 500 mm. Higher values of the length of the waveguide permits to have higher magnetic field attenuation, lower values may be chosen to adapt to the nacelle constraints.

BRIEF DESCRIPTION

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
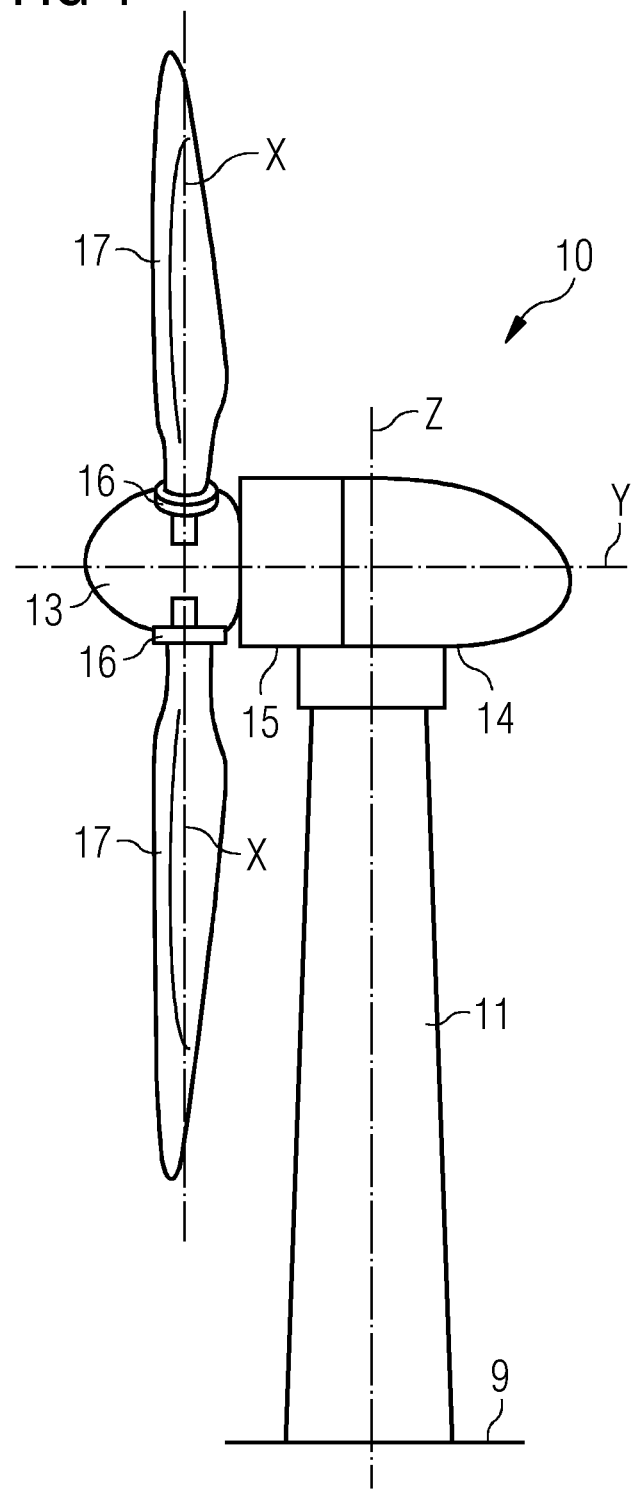
FIG. 1 shows a schematic lateral view of a wind turbine including a nacelle according to embodiments of the present invention.

FIG. 1 shows a direct drive wind turbine 10 for generating electricity. The wind turbine 10 comprises a tower 11 which is mounted on the ground 9 at one bottom end. At the opposite top end of the tower 11 there is mounted a nacelle 14. The nacelle 14 is usually mounted rotatable with regard to the tower 11 about a yaw axis Z substantially perpendicular to the ground 9. The nacelle 14 houses an electrical generator (not visible in FIG. 1). Furthermore, the wind turbine 10 comprises a hub 13 which is rotatably attached to the nacelle 14 for rotating about a rotational axis Y, which is a longitudinal axis of the nacelle 14. When not differently specified, the terms axial or longitudinal, radial and circumferential in the following are made with reference to the longitudinal rotor axis Y. The hub 13 is connected to the electrical generator in the nacelle 14, in order to receive rotational energy from the hub 13.

The wind turbine 1 further comprises at least one blade 17 (in the embodiment of FIG. 1, the wind rotor comprises three blades 17, of which only two blades 17 are visible) mounted on the hub 13. The blades 17 extend along respective blade longitudinal axes X, that are substantially radially oriented with respect to the rotational axis Y.

Figure 2:
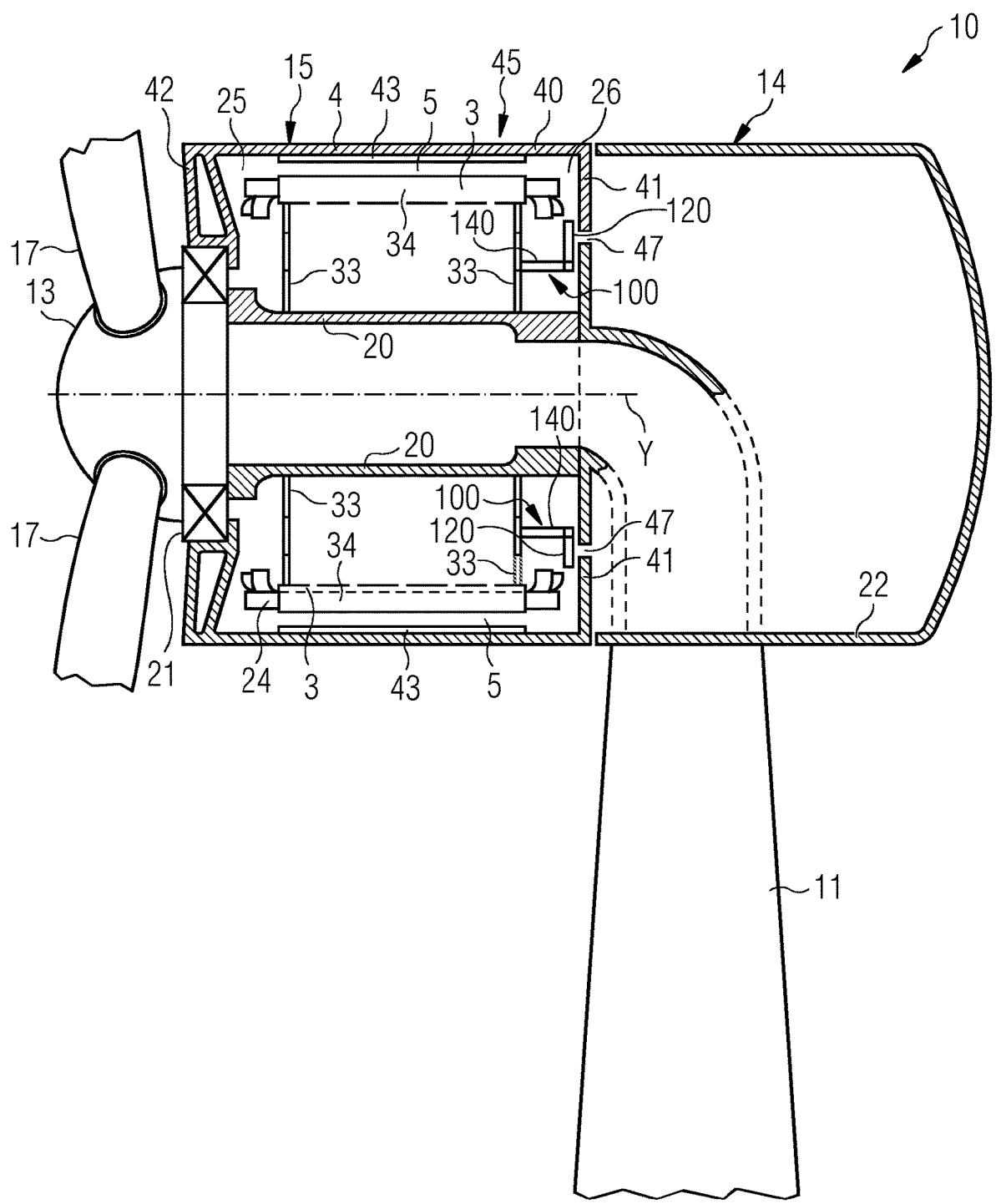
FIG. 2 shows a first schematic sectional view of the wind turbine of FIG. 1.

With reference to FIG. 2, the nacelle 14 includes a bedframe 22 having a flange for rotatably connecting the nacelle 14 to the tower 11 for allowing the rotation of the nacelle about the yaw axis Z. The nacelle further includes a hollow fixed shaft 20 extending coaxially with respect to the rotational axis Y. The hollow fixed shaft 20 coaxially extends along the rotational axis Y between two longitudinal ends, one of which is rigidly attached to the bedframe 22. A main bearing 21 of the wind turbine 10 is mounted the other longitudinal end of the hollow fixed shaft 20. The hub 13 is connected to the main bearing 21 for allowing the rotation of the hub 13 about the rotational axis Y.

The nacelle 14 comprises an electrical generator 15 extending along the rotational axis Y between a drive end adjacent to the hub 13 and a non-drive end adjacent to the bedframe 22. The electrical generator 15 comprises an outer rotor 4 and an inner stator 3, separated by an airgap 5. According to other embodiments of the present invention (not shown), the electrical generator 15 comprises an inner rotor and an inner stator, separated by an airgap. The stator 3 is rigidly supported by the hollow fixed shaft 20. The stator 3 comprises two stator support plates 33, respectively provided at the axial ends of the stator 3, for radially supporting a stator body 34. Between each of stator support plates 33 and the rotor 4 two annular spaces are defined, respectively a front annular space 25 close to the hub 13 and an axilla opposite rear annular space 26 close to the bedframe. The stator 3 includes a plurality of electrical conductors 24 in the form of windings housed in a plurality of stator slots (not shown) provided in the stator body 34. The windings include end-windings for connecting the windings in two different slots of the stator 3, the end-windings axially protruding at the axial ends of the stator body 34. During operation, the outer rotor 4 is caused to rotate about the rotational axis Y in order to transform mechanical energy into electrical energy. The rotor 4 includes an external rotor house 45 coaxially extending along the rotational axis Y between a hub interface 42 and an opposite axial end 41. According to the embodiment of the attached figures, the axial end 41 is shaped as an annular radially oriented end plate, which may have the function of a stiffener or a brake disc. The external rotor house 45 includes an external surface 40 exposed to a magnetic flux induced by lightning. The rotor 4 further includes a plurality of permanent magnets 43, radially facing the stator 3 at the airgap 5. The hub interface 42 is rigidly connected to the hub 13 and rotational connected to the main bearing 21 for allowing the rotation of the assembly including the hub 13 and the rotor house 45 about the rotational axis Y. The end plate 41 locks the rotation of the rotor 4 with respect to the stator 3 when required by the operating conditions. An opening 47 is provided between the end plate 41 and the hollow fixed shaft 20 for providing g the necessary distance between stationary and rotary parts of the nacelle 14. The opening 47 may be ring-shaped.

In the rear annular space 26, the nacelle 14 further includes a lightning protection arrangement 100 including a waveguide 110 between the rotor 4 and the stator 3. The waveguide 110 is interposed between the external surface 40 and the airgap 5 for providing a shielding to the electrical conductors 24 from the magnetic flux induced by a lightning strike hitting the external surface 40. The waveguide 110 may further providing a shielding to the permanent magnets 43, for preventing demagnetization. According to other embodiments of the present invention (not shown), more than one waveguide 110 may be interposed between the external surface 40 and the airgap 5 for providing a shielding to the permanent magnets 43.

Figure 3:
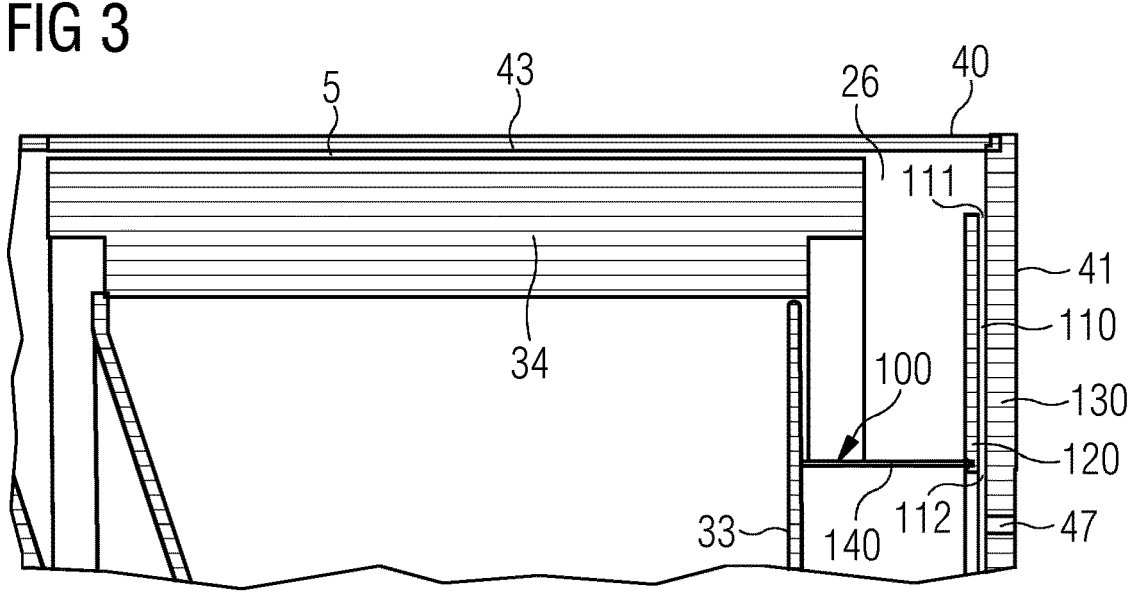
FIG. 3 shows a second more detailed schematic sectional view of the wind turbine of FIGS. 1 and 2.
Figure 4:
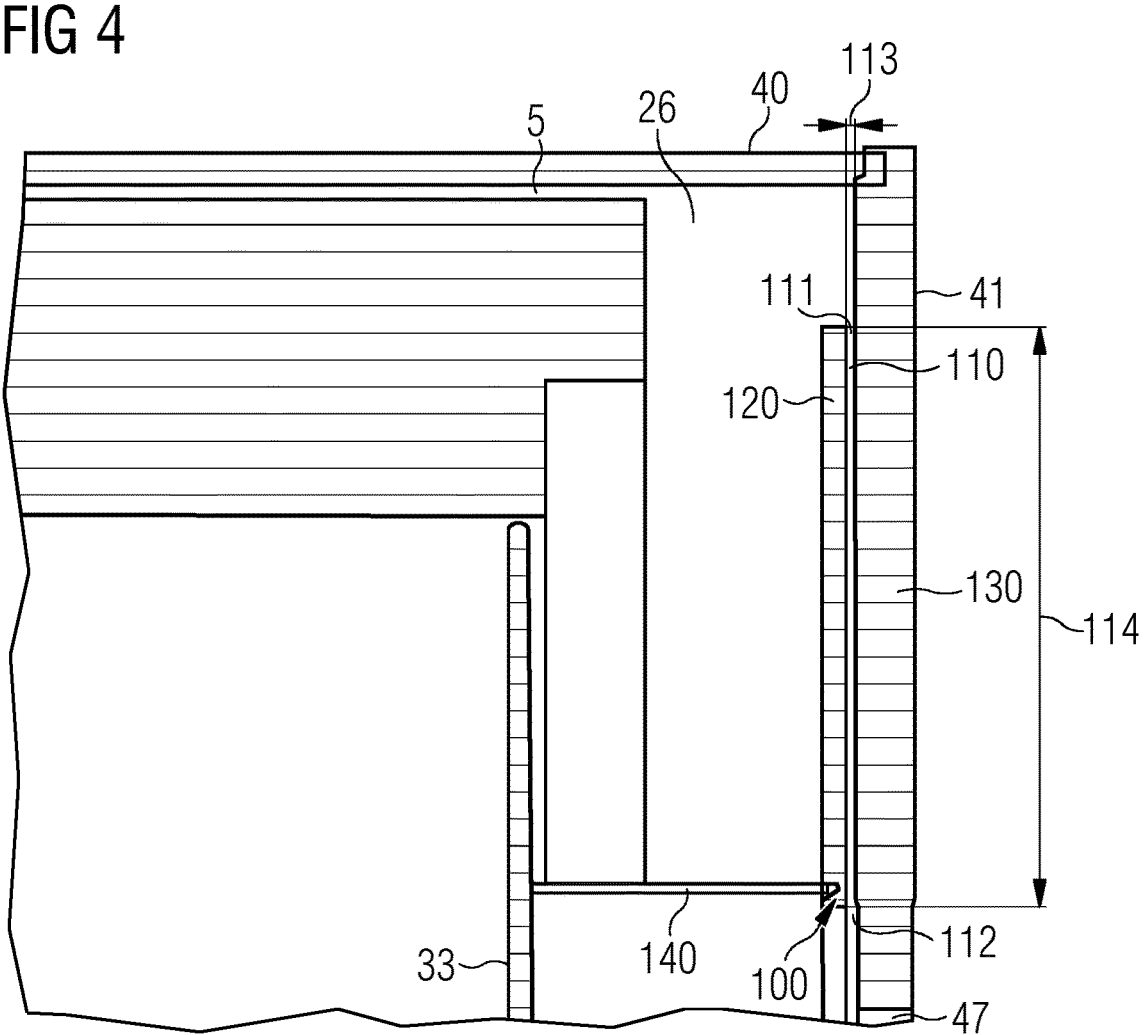
FIG. 4 shows a magnified view of components of the wind turbine of FIGS. 1, 2 and 3.

With reference to FIGS. 3 and 4, the waveguide 110 is provided at the opening 47 of the external surface 40, separating the rotor 4 from the stator 3. According to other embodiments of the present invention (not shown), a magnetic waveguide 110 may be provided at any other opening exposed to a magnetic flux induced by lightning.

The lightning protection arrangement 100 comprises a stationary plate 120 fixed to the stator 3 and a rotary plate 130 fixed to the rotor 4. The stationary plate 120 and the rotary plate 130 may be made of an electrically conductive material, in particular a metallic material. The waveguide 110 is provided between the stationary plate 120 and the rotary plate 130. In the embodiment of the FIGS. 3 and 4, the rotary plate 130 comprises the end plate 41 and is exposed to the magnetic flux induced by lightning. According to other embodiments of the present invention (not shown), for example having inner rotor and external stator, the stationary plate 120 may be exposed to the magnetic flux induced by lightning.

The lightning protection arrangement 100 comprises a structural element 140 connected to the stator support plates 33 at the rear end of the stator 3. The structural element 140 stator extends along the rotational axis Y, the stationary plate 120 protruding at an axial end of the structural element 140. In the particular embodiment of the FIGS. 3 and 4, the structural element 140 has a hollow cylindrical structure coaxial with the rotational axis Y from which the stationary plate 120 protrudes radially in the form of a radial external flange attached at the axial end of the structural element 140. According to other embodiments of the present invention (not shown), for example having inner rotor and external stator, a structural element 140 may be used for connecting the rotary plate 130 to the rotor.

In the embodiment of the FIGS. 3 and 4, the waveguide 110 is radially oriented. According to other embodiments of the present invention (not shown), the waveguide 110 may be inclined with respect to the rotational axis Y of angle ranging between 45 and 90 degrees. The waveguide 110 has a width 113, i.e., the distance between stationary plate 120 and the rotary plate 130, comprised between 1 and 15 mm. More particularly, the waveguide 110 has a width comprised between 8 and 12 mm. According to embodiments of the present invention, the width of the waveguide 110 may equal the width of the opening 47. The waveguide extends perpendicularly to its width, between two longitudinal ends 111, 112. The waveguide 110 may have a length 114, measured between the longitudinal ends 111, 112, comprised between 200 and 700 mm, more particularly between 400 and 500 mm. In the embodiment of the FIGS. 3 and 4, the length of waveguide 110 corresponds to the radial extension of the stationary plate 120.

When a magnetic flux is induced by lightning on the external surface 40, the waveguide 110, which is provided at the opening 47 or in the magnetic path between the opening 47 and the airgap 5, may reduce drastically the magnetic flux reaching the airgap 5, for example from 13,000 A/m (without waveguide 110) to the order of 2500 A/m (with waveguide 110). Such a reduction of magnetic field is acceptable, as it cannot create any significant impact on induced voltages in windings or in the magnetostriction of the permanent magnets.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A nacelle for a wind turbine comprising:
   a surface exposed to a magnetic flux induced by lightning;
   an electrical generator rotating about a rotational axis, the electrical generator comprising a rotor, a stator, an airgap separating the rotor and the stator, and a plurality of electrical conductors wound in the rotor or the stator adjacently to the airgap; and
   a lightning protection arrangement including at least one waveguide between the rotor and the stator and interposed between the surface and the electrical conductors for providing a shielding to the electrical conductors from the magnetic flux induced by lightning, wherein the at least one waveguide extends between a first plate connected to the stator and a second plate connected to the rotor that faces the first plate, wherein a distance between the first plate and the second plate defines a width of the at least one waveguide.

2. The nacelle according to claim 1, wherein the at least one waveguide is provided between an opening of the surface and the airgap.

3. The nacelle according to claim 2, wherein the opening separates the rotor from the stator.

4. The nacelle according to claim 2, wherein the opening is ring-shaped.

5. The nacelle according to claim 2, wherein the plurality of electrical conductors includes a plurality of end-windings, the at least one waveguide being interposed between the opening and the plurality of end-windings.

6. The nacelle according to claim 1, wherein the rotor comprises a plurality of plurality of permanent magnets radially facing the stator at the airgap, the at least one waveguide further providing a shielding to the permanent magnets from the magnetic flux induced by lightning.

7. The nacelle according to claim 1, wherein the first plate is a stationary plate fixed to the stator and the second plate is a rotary plate fixed to the rotor, the stationary plate or the rotary plate being exposed to the magnetic flux induced by lightning.

8. The nacelle according to claim 7, wherein the lightning protection arrangement comprises a structural element for connecting the stationary plate to the stator or the rotary plate to the rotor.

9. The nacelle according to claim 8, wherein the structural element extends parallel to the rotational axis.

10. The nacelle according to claim 7, wherein the lightning protection arrangement comprises a structural element connected to the stator and extending along the rotational axis, the stationary plate protruding at an axial end of the structural element.

11. The nacelle according to claim 10, wherein the rotary plate comprises a radially oriented end plate of the rotor.

12. The nacelle according to claim 1, wherein the at least one waveguide is inclined with respect to the rotational axis at an angle comprised between 0 and 90 degrees.

13. The nacelle according to claim 1, wherein the width of the at least one waveguide is between 1 and 15 mm.

14. The nacelle according to claim 13, wherein the width of the at least one waveguide equals a width of an opening of the surface.

15. The nacelle according to claim 1, wherein the at least one waveguide has a length comprised between 200 and 700 mm.

16. A wind turbine including:
   a hub;
   at least one blade fixed to the hub; and
   a nacelle on which the hub is rotatably mounted for rotating about a rotational axis, the nacelle being according to claim 1.

* * * * *